No. 756,717. PATENTED APR. 5, 1904.
H. J. SCHOOLS.
HOSE DRIER.
APPLICATION FILED JULY 27, 1903.
NO MODEL. 2 SHEETS—SHEET 1.
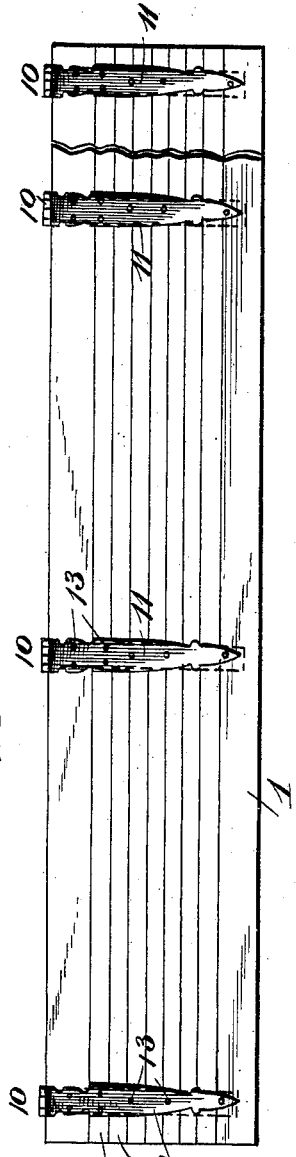
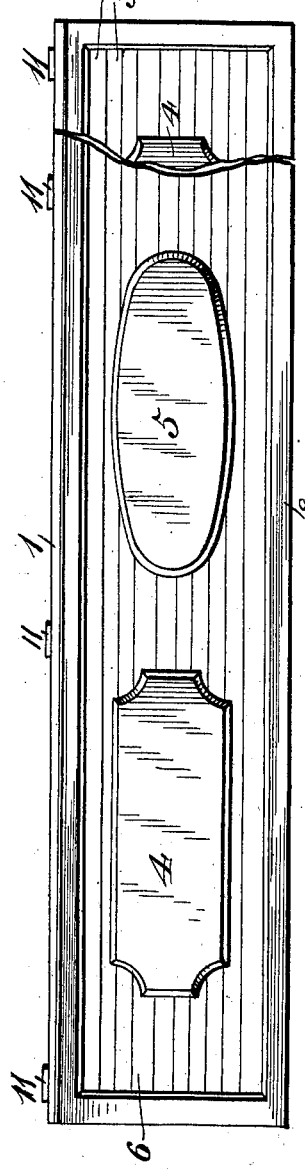
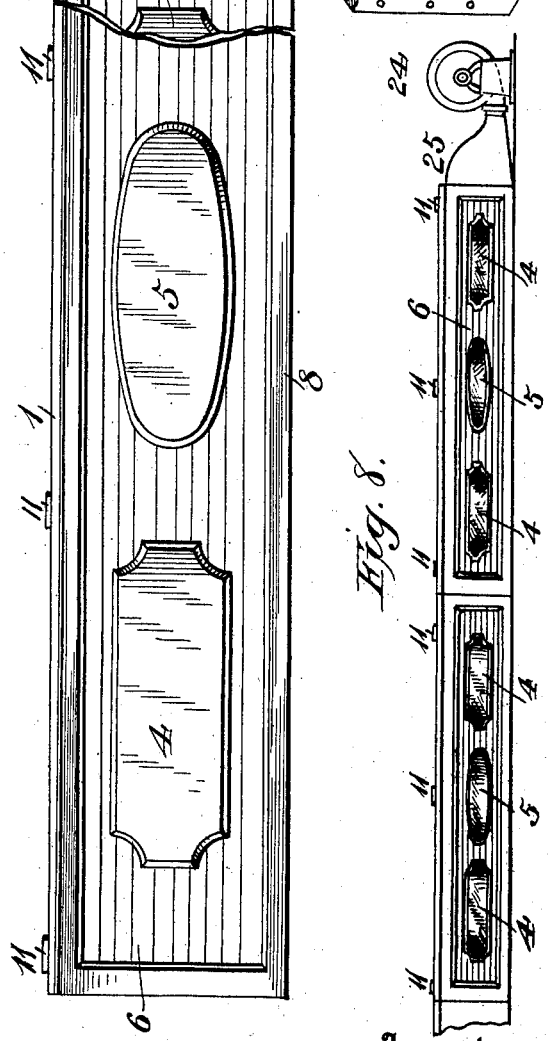
Witnesses
F. L. Ourand
W. Parker Reinohl
Inventor
H. J. Schools.
by D. L. Reinohl
Attorney.

No. 756,717. PATENTED APR. 5, 1904.
H. J. SCHOOLS.
HOSE DRIER.
APPLICATION FILED JULY 27, 1903.
NO MODEL. 2 SHEETS—SHEET 2.
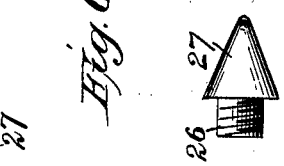
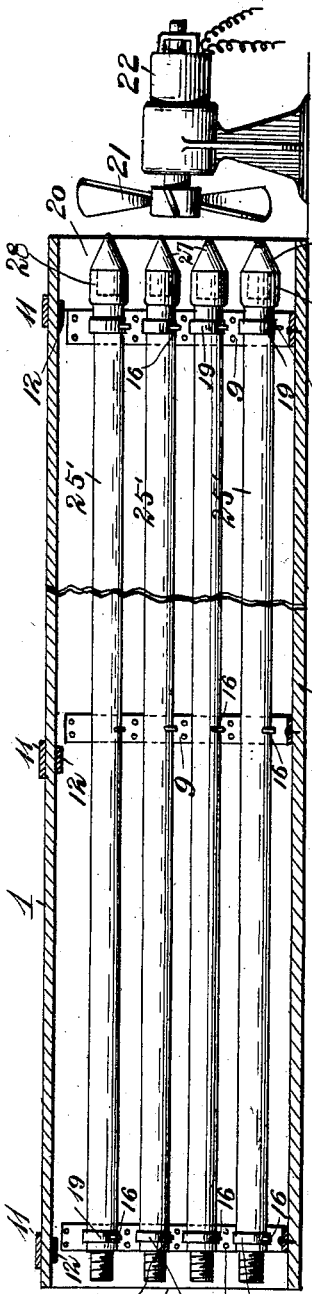
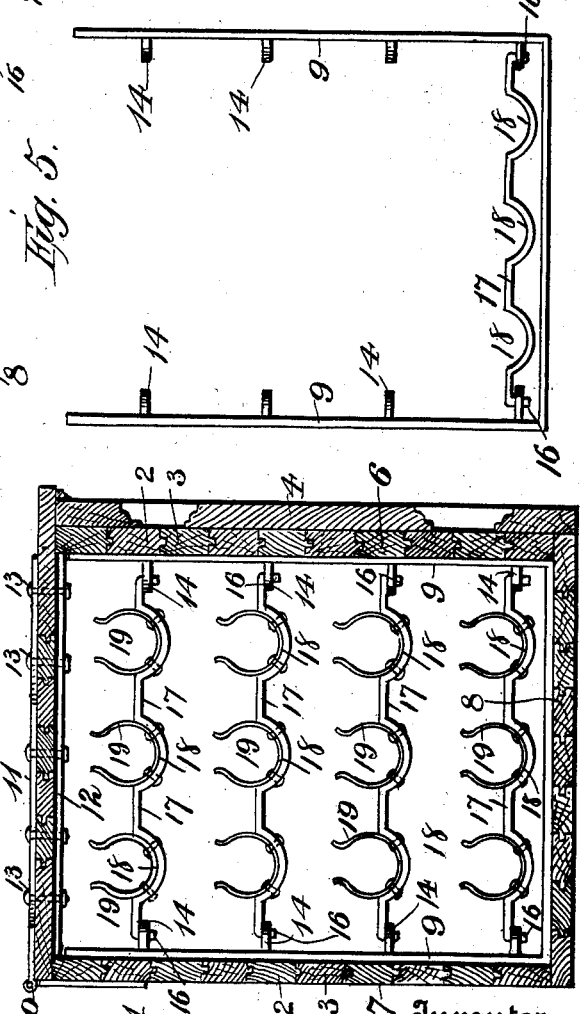

No. 756,717. Patented April 5, 1904.

UNITED STATES PATENT OFFICE.

HARRY J. SCHOOLS, OF LEBANON, PENNSYLVANIA.

HOSE-DRIER.

SPECIFICATION forming part of Letters Patent No. 756,717, dated April 5, 1904.

Application filed July 27, 1903. Serial No. 167,121. (No model.)

*To all whom it may concern:*

Be it known that I, HARRY J. SCHOOLS, a citizen of the United States, residing at Lebanon, in the county of Lebanon and State of Pennsylvania, have invented certain new and useful Improvements in Hose-Driers; and I do hereby declare the following to be a full, clear, and exact description of the invention, such as will enable others skilled in the art to which it appertains to make and use the same.

My invention relates to means for drying fire and other hose, and has for its object economy in handling and drying hose and the utilizing of the structure in which the hose is dried as a bunk in a fire-engine house.

The invention consists in certain improvements in construction, which will be fully disclosed in the following specification and claims.

In the accompanying drawings, which form part of this specification, Figure 1 represents a top plan view of the receptacle in which the hose is supported while being dried, the blower or fan being omitted; Fig. 2, a front or side elevation of the same; Fig. 3, a vertical longitudinal section showing hose in position for drying and a fan at one end of the receptacle; Fig. 4, an end view, on an enlarged scale, showing the end supports with their clamps to secure the hose in position; Fig. 5, a side elevation of one of the hose-supporting frames, with one support in position in the frame; Fig. 6, a side elevation of the air-distributer detached; Fig. 7, a perspective of one of the hose-supporting frames, and Fig. 8 a side elevation of the hose-receptacle with a blower attached and on a reduced scale.

Reference being had to the drawings and the designating characters thereon, the numeral 1 indicates a hose-receptacle of a length to receive a section of hose and of a depth and width to accommodate a plurality of layers of sections of hose, and yet retained in such height or depth and width as to make a comfortable bunk in a fire-engine or hose-house for the firemen to recline upon for rest or sleeping purposes. The receptacle is preferably of wood, made of tongue-and-grooved stuff, as shown at 2 3, with panels 4 5 secured to the front for strengthening and ornamenting the structure, and the sides 6 7 and the bottom 8 are secured to metallic frames 9 by screws in the usual manner, and the top or cover is secured to the body by hinges 10, having straps 11, which extend across the top a sufficient distance to engage all the boards 2 3 thereof, and underneath the straps are metallic bars 12, which are secured to the straps by bolts 13, thus stiffening and bracing the top securely for its purpose as a bunk.

The frames 9 are preferably castings and are provided with a plurality of lugs 14 on the inside of the vertical sides thereof, having holes 15 to receive the bent ends 16 of the transverse hose-supports 17, preferably of round or rod iron, having concave seats 18 for the hose to rest in and hold the sections separated, so that the entire exterior surface of the hose shall be exposed to the drying medium. The hose-supports 17 at each end of the receptacle 1 are provided with spring hose-clamps 19, into which the ends of the sections of hose are forced after having been drawn taut or stretched on the several supports 18 in the receptacle, and by which clamps the hose is held in stretched condition until dried, thus preventing any tendency to twist or bend or otherwise to become distorted while being dried.

The supports 17 may be supplied in any suitable number of layers, are readily inserted in the lugs of the frames, and removed from the receptacle to afford access to the next layer of hose.

The drying medium is preferably atmospheric air, which is taken from the room in which the hose-drier is placed and is forced into an open end 20 of the receptacle by a fan 21, propelled or driven by an electric motor 22 or by any preferred form of motor and discharged from the receptacle at the opposite end 23, as shown in Fig. 3, or a blower 24 may be connected to the receptacle by a trunk 25, as shown in Fig. 8. In either instance the hose is completely surrounded by the air traveling through the receptacle and the hose dried. In the ends of the sections of hose 25' adjacent to the fan or blower are placed plugs 26, having conical heads 27, with the apices of the cones toward the fan or blower to distribute the air and direct it to the surface of the hose as the air enters the receptacle. These plugs are preferably made of wood and forced into the coupling 28, as shown in Fig. 3.

Having thus fully described my invention, what I claim is—

1. A hose-drier consisting of a receptacle having frames therein to which the sides and bottom are secured, and provided with lugs on its vertical sides, and detachable transverse supports for hose engaging said lugs; in combination with means for supplying a drying medium to the hose.

2. A hose-drier consisting of a receptacle composed of tongue-and-grooved boards and having open ends, frames within the receptacle and to which the sides and bottom are secured, and transverse detachable supports arranged one above the other and provided with seats for the hose; in combination with means at one end of the drier for supplying a drying medium to the hose.

3. A hose-drier consisting of a rectangular receptacle of a height and width to form a bunk, having sides, bottom and top, the latter provided with hinges, metallic frames within the receptacle and to which said sides and bottom are secured, and means for supporting sections of hose out of contact with each other; in combination with means for supplying a drying medium to the hose.

4. A hose-drier consisting of a tongue-and-grooved rectangular receptacle, frames within the receptacle and to which the sides and bottom are secured, detachable transverse supports engaging said frames, and clamping members on the end supports separate from the walls of the receptacle; in combination with means for supplying a drying medium to the hose.

5. In a hose-drier, means for supporting hose, means for supplying a drying medium, and an air-distributer in one end of the hose for closing said end and directing the air to the outer surface of the hose.

In testimony whereof I affix my signature in presence of two witnesses.

HARRY J. SCHOOLS.

Witnesses:
  WM. H. GARRETT,
  E. O. HARTMAN.